(12) United States Patent
Iguchi

(10) Patent No.: US 8,635,960 B2
(45) Date of Patent: Jan. 28, 2014

(54) FREE BALL BEARING, BEARING UNIT, SUPPORT TABLE CARRYING EQUIPMENT, AND TURNTABLE

(75) Inventor: Kaoru Iguchi, Tokyo (JP)

(73) Assignee: Iguchi Kiko Co., Ltd. (JP)

( * ) Notice: Subject to any disclaimer, the term of this patent is extended or adjusted under 35 U.S.C. 154(b) by 188 days.

(21) Appl. No.: 13/257,208

(22) PCT Filed: Apr. 14, 2010

(86) PCT No.: PCT/JP2010/002692
§ 371 (c)(1),
(2), (4) Date: Sep. 16, 2011

(87) PCT Pub. No.: WO2010/119675
PCT Pub. Date: Oct. 21, 2010

(65) Prior Publication Data
US 2012/0006237 A1    Jan. 12, 2012

(30) Foreign Application Priority Data
Apr. 14, 2009   (JP) ............................. P2009-098501

(51) Int. Cl.
*A47B 11/00*   (2006.01)
(52) U.S. Cl.
USPC .......................................................... 108/139
(58) Field of Classification Search
USPC ............... 108/20, 22, 103–104, 139; 384/49; 193/35 MD; 198/370.09; 188/82.1, 188/82.3, 82.77, 82.84
See application file for complete search history.

(56) References Cited

U.S. PATENT DOCUMENTS 4,553,795 A * 11/1985 Takagi ............................. 384/49
4,696,583 A *  9/1987 Gorges ............................ 384/49
(Continued)

FOREIGN PATENT DOCUMENTS

| JP | 06114661 A | 4/1994 |
|---|---|---|
| JP | 06061326 U | 8/1994 |

(Continued)

OTHER PUBLICATIONS

International Search Report; Application No. PCT/JP2010/002692; Issued: May 18, 2010; 1 page.
(Continued)

*Primary Examiner* — Hanh V Tran
(74) *Attorney, Agent, or Firm* — St. Onge Steward Johnston & Reens LLC

(57) ABSTRACT

A free ball bearing includes: a main body that has a ball retainer where a ball-retaining recess having an inner surface of a semi-circular recessed surface is formed; a plurality of retainer balls that is disposed on the semi-circular recessed surface of the main body and a main ball that has a diameter larger than the retainer balls and is rotatably supported through the retainer balls; a cover portion that surrounds the ball retainer of the main body while ensuring a predetermined internal space; a retained ball-pressing ring that has a ring-shaped pressing member that is inserted in between the semi-circular recessed surface of the main body and the main ball and presses the retainer balls, and is disposed to be movable in the internal space in the depth direction of the ball-retaining recess, between a pressing position where the retainer balls are pressed and a releasing position where the retainer balls are released; and a releasing mechanism that moves the retained ball-pressing ring from the pressing position to the releasing position by applying a displacement force to the retained ball-pressing ring.

8 Claims, 7 Drawing Sheets

(56) References Cited

U.S. PATENT DOCUMENTS

| | | | |
|---|---|---|---|
| 4,732,490 A * | 3/1988 | Masciarelli | 384/49 |
| 5,222,585 A * | 6/1993 | van der Werff | 198/369.4 |
| 5,516,211 A * | 5/1996 | Barnes et al. | 384/49 |
| 6,279,716 B1 * | 8/2001 | Kayatani et al. | 193/35 MD |
| 6,516,934 B2 * | 2/2003 | Masciarelli, Jr. | 193/35 SS |
| 6,786,318 B1 * | 9/2004 | Pace et al. | 193/35 SS |
| 8,011,307 B2 * | 9/2011 | Marcelli | 108/55.3 |
| 2007/0029158 A1 * | 2/2007 | Iguchi et al. | 193/35 MD |
| 2008/0271972 A1 * | 11/2008 | Szarkowski et al. | 193/35 MD |

FOREIGN PATENT DOCUMENTS

| | | | | |
|---|---|---|---|---|
| JP | 2004019876 A | | 1/2004 | |
| JP | 2004019877 A | | 1/2004 | |
| JP | 2005322894 A | * | 11/2005 | H01L 21/68 |
| JP | 2007230722 A | | 9/2007 | |
| JP | 2008281207 A | | 11/2008 | |
| JP | 2012021555 A | * | 2/2012 | |
| JP | 2012021556 A | * | 2/2012 | |
| TW | 200521349 | | 7/2005 | |
| TW | 200524799 | | 8/2005 | |
| TW | I278082 | | 4/2007 | |
| WO | WO 2005098935 A1 | * | 10/2005 | H01L 21/68 |

OTHER PUBLICATIONS

International Search Report & Written Opinion of the International Searching Authority Application No. PCT/JP2010/003244 Completed: May 27, 2010; Mailing Date: Jun. 8, 2010 9 pages.

Search Report and Notice of Allowance Taiwan Patent Application No. 99115400 Mailing Date: Apr. 24, 2013 4 pages.

US Office Action & Notice of References Cited (PTO-892) U.S. Appl. No. 13/320,178 Issued: Apr. 3, 2013 9 pages.

Office Action Type: Notice of Allowance Country Code: TW Taiwan Patent Application No: 99111562 Mailing Date: Apr. 29, 2013 4 pages.

Office Action Type: Notice of Allowance Country Code: KR Korean Patent Application No: 10-2011-7027784 Mailing Date: Jul. 18, 2013.

* cited by examiner

FREE BALL BEARING, BEARING UNIT, SUPPORT TABLE CARRYING EQUIPMENT, AND TURNTABLE

TECHNICAL FIELD

The present invention relates to a free ball bearing that has a structure with one omnidirectionally rotatable ball (main ball) protruding, and is suitable for application to a support table, a turntable, and the like that are used to carry or locate items.

The present invention relates to a free ball bearing that is suitable for use in a clean room that is used to machine, for example, a semiconductor substrate or a printed circuit board, mount electronic components, manufacture a flat panel, manufacture electronic components, such as a semiconductor device or a semiconductor package, or make food or medicines, and a bearing unit using the free ball bearing, a support table, carrying equipment, and a turntable.

Priority is claimed on Japanese Patent Application No. 2009-098501, filed on Apr. 14, 2009, the content of which is incorporated herein by reference.

BACKGROUND ART

For example, carrying equipment that carries items generally employs a configuration that supports a carried item to be transportable, using a free ball bearing with one omnidirectionally rotatable protruding ball (main ball).

In the carrying equipment, a stopper that hits against the item, a cushion, a guide member that is in contact with the item, and the like may be provided separately from the free ball bearing to stop or decelerate movement of the item that is being carried. Recently, a configuration in which the free ball bearing itself can apply a braking force to the item that is being carried has been proposed (for example, Patent Document 1). Conveying equipment using the free ball bearing is advantageous in that it not necessary to dispose a stopper, a cushion, or a guide member.

The free ball bearing (a device for supporting a transportation ball body) shown in FIGS. 1A and 1B in Patent Document 1 includes a recessed round member that supports a main ball to be rotatable on a recessed round surface through a plurality of sub-balls and a cover member that has an inner hole through which the upper portion of the main ball protrudes, in which a rotatable state where the main ball is close to the rim of the inner hole with a small gap between the rim of the main ball and the inner hole and a braking state where the rim of the inner hole is in press-contact with the main ball are switched.

Further, in FIGS. 2A and 2B of Patent Document 1, show a free ball bearing (device for supporting a ball body) having a configuration that, when a pressing member having a ring-shaped sub-ball contact portion moves down due to being moved up and down by a driving means (in detail, an electro-magnet 34 with a magnet coil), applies a braking operation to the rotation of a main ball by bringing the sub-ball contact portion of the sub-balls in contact with the upper edge of a group of the sub-balls to restrict the movement of the sub-balls.

RELATED ART DOCUMENTS

Patent Documents

[Patent Document 1] Japanese Unexamined Patent Application, First Publication No. 2004-19877

DISCLOSURE OF THE INVENTION

Problems to be Solved by the Invention

The configuration that brakes the main ball by bringing the cover member in contact with the main ball, as in the free ball bearing (device for supporting a transportation ball body) shown in FIGS. 1A and 1B of Patent Document 1 has a problem in that the main ball is damaged when used for a long period of time, such that it is difficult to apply movement resistance to a moving item because the groove on the surface of the main ball causes a gap to occur between the main ball and the item.

As shown in FIGS. 2A and 2B of Patent Document 1, the configuration that presses the sub-balls with a pressing member that moves up/down is advantageous in that it is possible to apply a desired movement resistance to an item stable for a long period of time.

The free ball bearing, which is used in a clean room that is used to machine, for example, a semiconductor substrate or a printed circuit board, mount electronic components, manufacture a flat panel, manufacture electronic components, such as a semiconductor device or a semiconductor package, or make food or medicines, requires high dust resistance against the generation of dust.

A small amount of dust may be generated by the contact between the cover member and the main ball in the free ball bearing (device for supporting a transportation ball body) shown in FIGS. 1A and 1B of Patent Document 1 and the contact between the sub-balls and the pressing member moving up/down under the cover member (indicated by reference numeral '5a' in Patent Document 1) in the free ball bearing (device for supporting a transportation ball body) shown in FIGS. 2A and 2B of Patent Document 1. Therefore, it is required to prevent dispersion of dust to maintain room cleanliness.

From this viewpoint, for example, by using, as the table where the free ball bearing is mounted, one in which a large number of ventilation holes are formed, it may be possible to adopt a measure for preventing dust from dispersing by making air flow under the table with a plurality of ventilating holes, where a free ball bearing is mounted, through the ventilation holes from above the table in a clean room. However, in the configuration in which the sub-balls are pressed by the pressing member moving up/down under the cover member, as in the free ball bearing (device for supporting a transportation ball body) shown in FIGS. 2A and 2B in Patent Document 1, it is difficult to collect dust generated between the cover member and the recessed round surface rotatably supporting the main ball and the sub-balls and it is disadvantageous in terms of stably maintaining cleanliness.

Further, a cylindrical body (a hydraulic cylinder 12 in the invention shown in FIGS. 1A and 1B in Patent Document 1), which slides on the outer circumferential surface of the recessed round surface member rotatably supporting the main ball and the sub-balls, is driven by hydraulic pressure, such as air pressure, like a hydraulic cylinder 12 formed by combining a cylinder unit 13 with the cover member 5, in the configuration of the free ball bearing (device for supporting a transportation ball body) shown in FIGS. 1A and 1B in Patent Document 1. In this case, there is an advantage in that the restraint of rotation (increase in rotational resistance) can be simultaneously implemented for the main balls of a plurality of free ball bearings. This configuration can also be applied to moving of the pressing member of the free ball bearing (a device for supporting a ball body used for carrying) shown in FIGS. 2A and 2B in Patent Document 1.

The technology shown in FIGS. 1A and 1B of Patent Document 1 provides an O-ring on the outer circumferential surface of the recessed round member to increase sealability between the outer circumferential surface of the recessed round member and the cylindrical portion. However, the mechanism that uses an O-ring and is driven by a driving source, which is hydraulic pressure, such as air pressure, generally needs to use grease to reduce the movement resistance against the movable member (hydraulic cylinder 12 shown in FIGS. 1A and 1B in Patent Document 1), but there is a problem in that the volatile components in the grease are a cause of contamination of the inside of the clean room.

The present invention is made in consideration of the problems and it is an object to provide a free ball bearing that can prevent dust from dispersing in a clean room and can also restrain movement resistance against a retainer balls-pressing ring, which increases rotational resistance against a main ball by pressing retainer balls, to a low level in a non-grease type without using grease, a bearing unit, a support table, carrying equipment, and a turntable, which use the free ball bearing.

Means for Solving the Problems

In order to solve the problems, the present invention provides the following configurations.

(1) A free ball bearing according to an aspect of the present invention includes: a main body that has a ball retainer where a ball-retaining recess having an inner surface of a semi-circular recessed surface is formed; a plurality of retainer balls that is disposed on the semi-circular recessed surface of the main body and a main ball that has a diameter larger than the retainer balls and is rotatably supported through the ball retainer; a cover portion that surrounds the ball retainer of the main body while ensuring a predetermined internal space; a retained ball-pressing ring that has a ring-shaped pressing member that is inserted in between the semi-circular recessed surface of the main body and the main ball and presses the retainer balls, and is disposed to be movable in the internal space in the depth direction of the ball-retaining recess, between a pressing position where the retainer balls are pressed and a releasing position where the retainer balls are released; and a releasing mechanism that moves the retained ball-pressing ring from the pressing position to the releasing position by applying a displacement force to the retained ball-pressing ring, in which an opening having a diameter smaller than the diameter of the main ball is formed through the cover portion; a portion of the main ball protrudes from the opening toward the tip end side, an air hole that communicates with the internal space and is open to the base end side opposite the tip end side is formed through the main body and/or the cover portion, the retained ball-pressing ring includes a driving ring portion disposed between the outer circumferential surface of the ball retainer and the inner circumferential surface of the cover portion, the driving ring portion has an inner circumferential surface disposed close to the outer circumferential surface of the ball retainer through a first gap allowing air to flow and an outer circumferential surface disposed close to the inner circumferential surface of the cover portion through a second gap allowing air to flow, and a groove circumferentially extending or a wear ring is disposed on the inner circumferential surface and/or the outer circumferential surface of the driving ring portion; and the first gap and the second gap are sized such that a displacement force is applied to the retained ball-pressing ring toward the base end side of the internal space when the air in the internal space is sucked through the air suction hole.

(2) In the free ball bearing of (1), a spring that applies a displacement force to the retained ball-pressing ring and elastically biases the retained ball-pressing ring toward the releasing position from the pressing position may be further disposed in the internal space as the releasing mechanism.

(3) In the free ball bearing of (1) or (2), the main body may further have a threaded-shaft protruding from the base end side of the ball retainer, and the air suction hole is formed at the main body and is open to the outer circumferential surface of the ball retainer through the threaded-shaft in the center axial direction of the threaded-shaft.

(4) In the free ball bearing of (1) or (2), the cover portion may include: a ring-shaped base end-sided cover member that is thread-fastened to the threaded-shaft of the main body; and a ring-shaped cap that is fitted or thread-fastened on the outer circumferential portion of the base end-sided cover member and has the main ball protrusion opening.

(5) A bearing unit according to an aspect of the present invention includes the free ball bearing of (1) or (2); and a suction device connected to the air suction hole of the free ball bearing.

(6) A support table according to an aspect of the present invention is equipped with the bearing unit of (5), in which the free ball bearing of the bearing unit is mounted at a plurality of positions on a horizontal base, and pipes connecting the suction device to the air suction holes of the free ball bearings to suck air are connected to the air suction holes from under the base.

(7) Carrying equipment according to an aspect of the present invention is equipped with the support table of (6).

(8) A turntable according to an aspect of the present invention includes: a base member; a rotary table rotatably disposed on the base member; and a rotating device rotating the rotary table, in which the rotary table is rotatably supported with respect to the base member by the free ball bearing of (1) or (2) which is mounted on the base member and/or the rotary table, and a suction device is connected to each free ball bearing.

Effects of Invention

According to the present invention, it is possible to apply a displacement force to the retained ball-pressing ring toward the base end side of the internal space of the free ball bearing by sucking the air in the internal space through the air hole (hereafter, referred to as an air suction hole) formed at the main body and/or the cover portion of the free ball bearing. Therefore, it is possible to increase the rotational resistance against the main ball by pressing the retainer balls with the ring-shaped pressing member protruding from the retained ball-pressing ring. When air suction from the air hole is performed, a displacement force is applied to the retained ball-pressing ring toward the base end side of the internal space such that the driving ring portion of the retained ball-pressing ring is sucked to the base end side of the internal space of the free ball bearing. The groove of the driving ring portion of the retained ball-pressing ring or the wear ring effectively contributes to generating the displacement force to the retained ball-pressing ring.

Further, the inner circumferential surface of the driving ring portion of the retained ball-pressing ring is disposed close to the outer circumferential surface of the ball retainer through the small gap allowing air to flow, while the outer circumference is disposed close to the inner circumferential surface of the cover portion, which is opposite the outer circumferential surface of the ball retainer through the internal space, through the small gap allowing air to flow. Therefore, when the air in the internal space is sucked from the air hole, air flow is formed in the gap. When a wear ring is used, air flow between the gaps is ensured by a slit-shaped disconnected portion of the wear ring. Therefore, when the air in the internal space is sucked from the air hole, the air at the open end side (main ball protrusion opening, ball-retaining recess side) can be sucked from the driving ring portion of the retained ball-pressing ring in the internal space of the free ball bearing. Therefore, it is possible to prevent dust due to the movement of the retained ball-pressing ring from being discharged outside from the cover member.

Further, the free ball bearing according to the present invention can restrain movement resistance in the height direction of the ball retainer of the retained ball-pressing ring, because grease is not provided between the ball retainer, the cover portion, and the retained ball-pressing ring.
Therefore, it is possible to easily move the retained ball-pressing ring by sucking the air from the air hole.

Further, since grease is not used, it is possible to prevent contamination of the inside of the clean room due to the volatile components of the grease.

DESCRIPTION OF EMBODIMENTS

Hereinafter, a first embodiment of the present invention is described with reference to the drawings.

First Embodiment

Figure 1A:
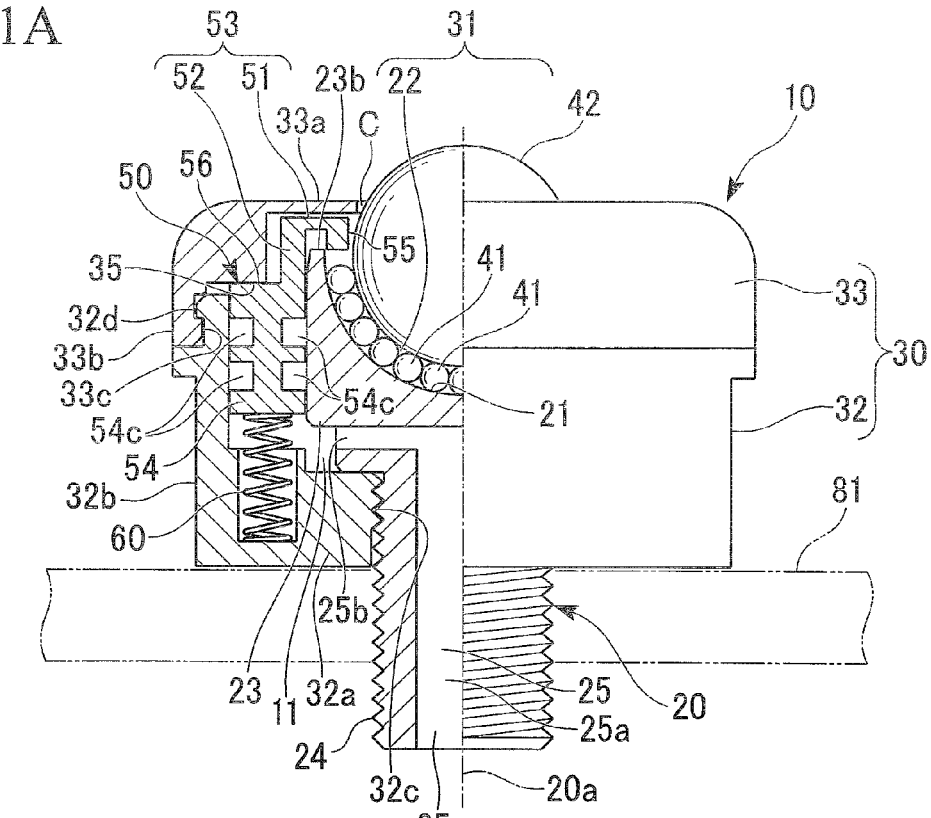
FIG. 1A is a partial cross-sectional view showing the configuration of a free ball bearing according to a first embodiment of the present invention, in which retainer balls are not braked by a retained ball-pressing ring.
Figure 1B:
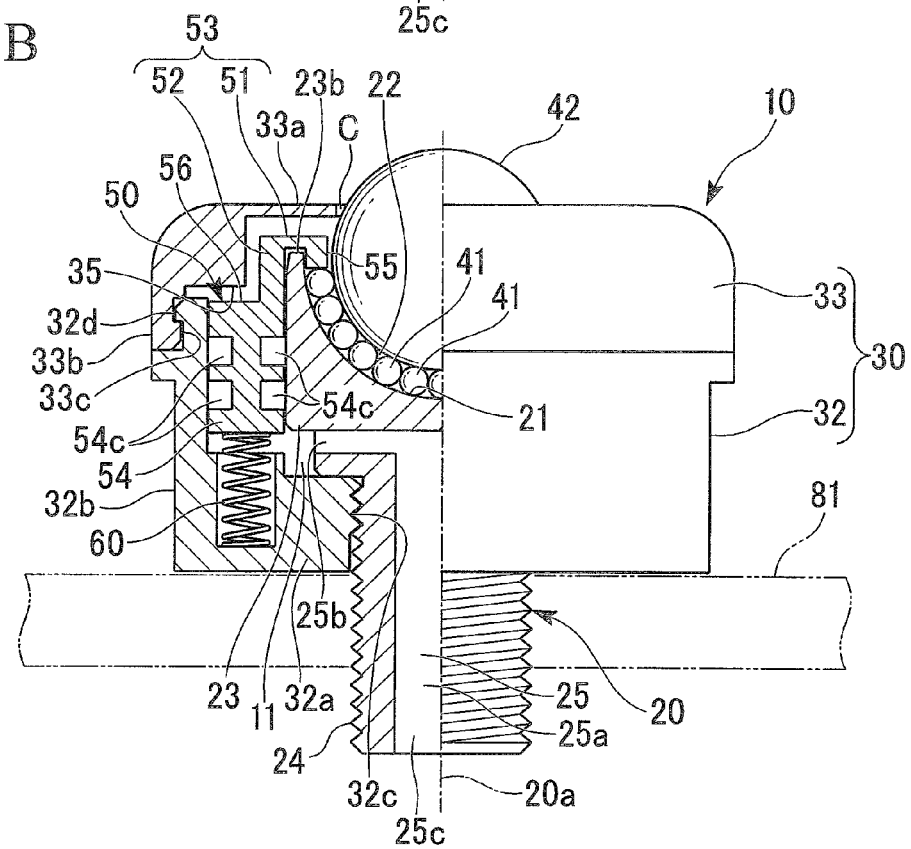
FIG. 1B is a view showing the free ball bearing of FIG. 1A in which the retainer balls are braked by the retained ball-pressing ring.

A free ball bearing according to the first embodiment of the present invention is described first with reference to FIGS. 1A and 1B.

In FIGS. 1A and 1B, an example when a main ball is disposed to protrude upward in a free ball bearing 10 is exemplified, in which the vertical upper side is the upside and the vertical lower side is the downside. The free ball bearing 10 may be disposed in any direction, other than the above, with respect to the vertical direction.

Figure 3:
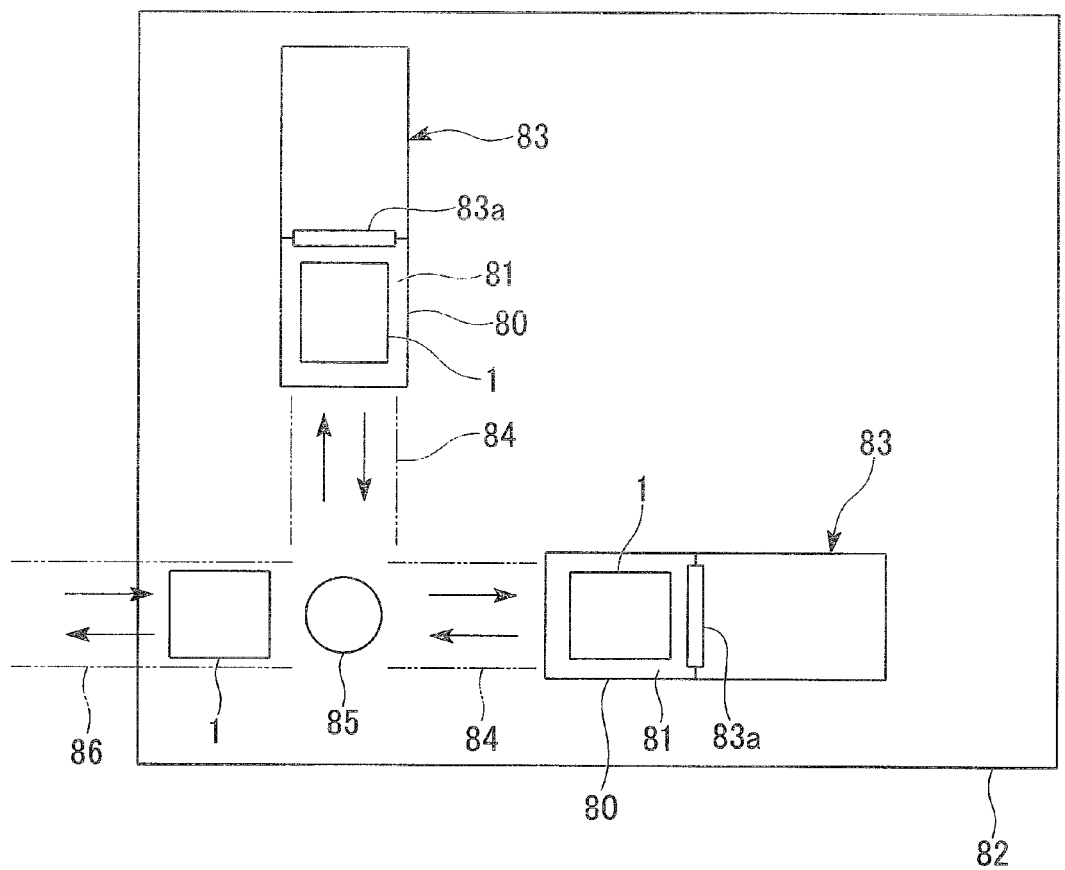
FIG. 3 is a plan view illustrating an example of substrate processing equipment that is carrying equipment equipped with the free ball bearing according to the present invention, and a bearing unit and a support table using the free ball bearing.
Figure 4:
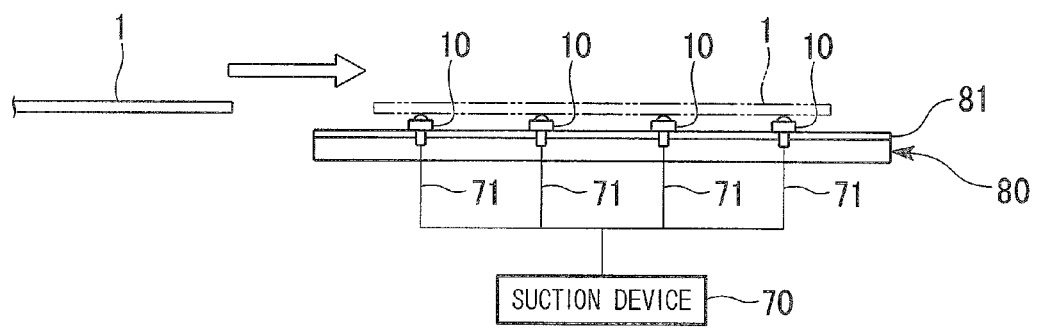
FIG. 4 is a front view illustrating a support table of the substrate processing equipment of FIG. 3.

As shown in FIGS. 3 and 4, the free ball bearing 10 described herein may be mounted on a horizontal base 81 of a substrate locating table 80 (support table) that accurately locates a substrate 1, such as mother glass for display or a silicon substrate (wafer).

As shown in FIG. 3, the substrate locating table 80 is disposed in a clean room 82 of processing equipment that forms a layer on the substrate 1. A plurality of processing rooms 83 (chambers) that performs processes, such as layering, applying of a resistor, exposing, and etching, are disposed in the clean room 82. The substrate locating table 80 is disposed outside a substrate entrance gate (openable/closable shutter 83a) of the processing rooms 83 in the clean room 82 and functions to locate the substrate 1 brought by carrying devices 84 disposed in the processing rooms 83 in the clean room 82, before the substrate is carried by substrate carrying devices in the processing rooms 83 (carrying unit in the processing room).

The carrying device 84 is disposed between a center robot 85 disposed in the clean room 82 and the substrate locating table 80 disposed to correspond to the processing room 83 and carries the substrate 1 between the center robot 85 and the substrate locating table 80. The center robot 85 moves the substrate 1 between the carrying devices 84 and moves the substrate 1 between a transport device 86 for bringing the substrate 1 in/out with respect to the clean room 82 and the carrying device 84.

The substrate 1 brought on the base 81 is placed and horizontally supported on main balls 42 (described below) protruding upward from the free ball bearings 10 disposed and protruding at a plurality of positions on the base 81. Further, in this state, as shown in FIG. 5, a pair of L-shaped locating members 87 of the locating device disposed on the substrate locating table 80 locate the substrate 1, with the substrate 1 therebetween, in contact with a pair of corners positioned in a diagonal line in the four corners of the rectangular plate-shaped substrate 1.

Figure 5:
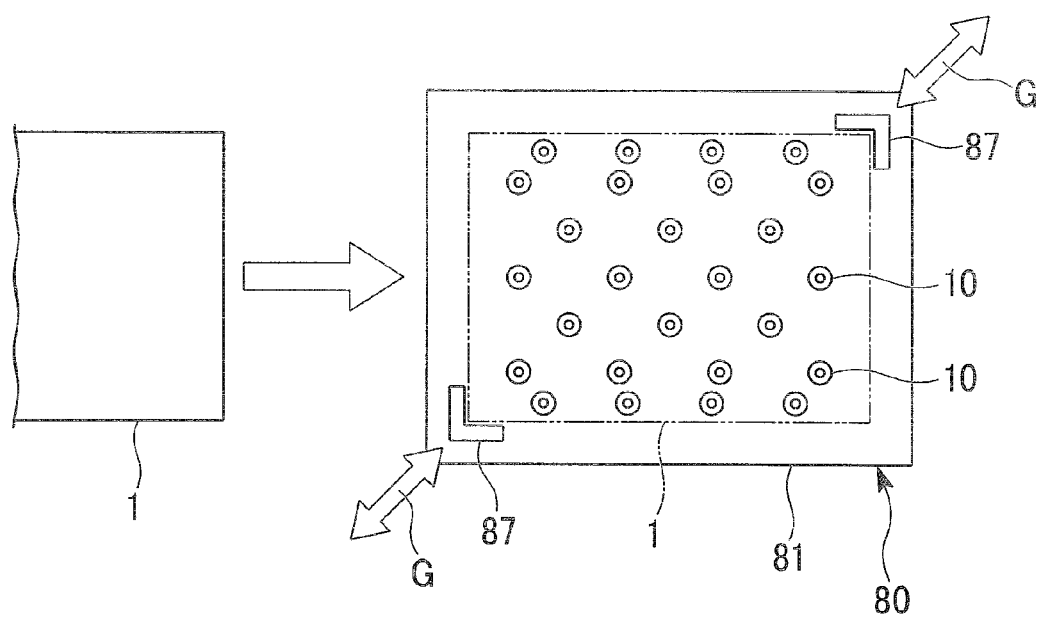
FIG. 5 is a plan view illustrating the support table of the substrate processing equipment of FIG. 3.

As indicated by an arrow G in FIG. 5, the pair of locating members 87 are moved by a driving device disposed in a locating device while the distance from each other in the gap direction changes. The pair of locating members 87 move away from each other to positions where the locating members do not interfere with the next carrying operation of the substrate 1, after locating the substrate 1 with both sides therebetween.

As shown in FIGS. 1A and 1B, the free ball bearing 10 described herein includes the following parts. The main body 20 includes a block-shaped (in detail, cylindrical) ball retainer 23 where a ball-retaining recess 22 that has the semi-spherical recessed surface 21 as the inner surface is formed and a threaded-shaft 24 that protrudes from an (base-sided) end opposite an opening of the ball-retaining recess 22 of the ball retainer 23. The housing-shaped cover portion 30 is disposed to surround the ball retainer 23 of the main body 20. The plurality of retainer balls 41 is disposed on the semi-spherical recessed surface 21 of the ball retainer 23. The main ball 42 is formed to have a diameter larger than the retainer balls 41 and is rotatably supported on the semispherical recessed surface through the retainer balls 41. The retained ball-pressing ring 50 is disposed to be movable in the height direction of the ball retainer (up/down in FIGS. 1A and 1B), which is the same direction as the depth direction of the ball-retaining recess 22 in an internal space 11 ensured between the ball retainer 23 and the cover portion 30. The spring 60 (press-releasing mechanism) is mounted in the cover portion 30 and elastically biases the retained ball-press ring 50 opposite the base end side of the internal space in the height direction of ball retainer. A portion of the main ball 42 protrudes from a main ball protrusion opening 31 formed in the cover portion 30. The main ball 42 is prevented from falling out by the cover portion 30.

The inner diameter of the main ball protrusion opening 31 of the cover portion 30 is smaller than the outer diameter of the main ball 42. As shown in FIGS. 1A and 1B, the inner diameter of the main ball protrusion opening 31 is set such that a clearance C that allows the main ball 42 to freely move is ensured between the inner circumferential surface of the main ball protrusion opening 31 and the main ball 42, with the main ball 42 supported by the plurality of retainer balls 41 that are in contact with the semispherical recessed surface 21 of the ball retainer 23 of the main body 20, without floating from the retainer balls 41.

The phantom line indicated by a reference numeral '20a' in FIGS. 1A and 1B shows the center axial line of the threaded-shaft 24 of the main body 20. The phantom line indicated by the reference numeral '20a' is positioned at the center of the opening of the ball retaining-recess 22 of the main body 20 and the deepest portion of the ball retaining-recess 22 is positioned on the center axial line 20a. The center axial line 20a is referred to as a main body axial line.

In FIG. 4, in the free ball bearing 10, the main body axial line 20a is vertically fixed such that the opening of the ball-retaining recess 22 is positioned above the ball retainer 23 by tightening up the threaded-shaft 24 into the base 81 of the substrate locating table 80. However, the free ball bearing 10 may be used, with the opening of the ball-retaining recess 22 positioned above the ball retainer 23 and the main body axial line 20a inclined, and with the height direction of the ball retainer being horizontal. For example, when the height direction of the retainer is the horizontal, the main ball 42 can be omnidirectionally rotatably supported by the retainer balls 41, and the rotational resistance against the main ball 42 is small and the main ball 42 can be smoothly rotated by a small force, unless the retainer balls 41 are pressed by the retained ball-pressing ring 50, as described below.

In FIGS. 1A and 1B, the main body 20, cover portion 30, retainer balls 41, main ball 42, and retained ball-press ring 50 of the free ball bearing 10 according to the present invention may be made of metal or plastic.

Further, the main ball 42 may be made of conductive (conductive in a narrow sense), or semi-conductive resin to have a surface resistivity of $10^3$ to $10^{10}$ Ω/square and a grounding conductive portion that is in contact with the main ball 42 may be disposed in order to prevent a spark due to static electricity charged in the substrate 1 when the substrate 1 comes in contact with the main ball 42. For example, a free ball bearing having a configuration with a grounding conductive portion composed of the retainer balls 41 and the main body 20 is acquired by employing a configuration in which the main ball 42 having a surface resistivity of $10^3$ to $10^{10}$ Ω/square described above is used, retainer balls 41 made of conductive metal, such as stainless steel are used, or the main body 20 is made of conductive metal, such as stainless steel, or a configuration including a conductive circuit (including a contact portion that is connected with the retainer balls 41 and ensures conductivity) composed of wires in a mother material made of an insulating material, such as plastic. It is possible to prevent a spark from being generated when the substrate 1 comes in contact with the main ball 42 by contacting the grounding conductive portion with a grounding circuit outside the free ball bearing. Since the generation of a spark causes the substrate 1 to be damaged, it is possible to prevent the substrate 1 from being damaged by the spark by using the free ball bearing 10 having the configuration described above, such that it is possible to improve a product yield ratio.

The retainer balls 41 and the main body 20 may be made of semi-conductive resin.

Further, in the free ball bearing 10 shown in the figures, the threaded-shaft 24 is integrally formed with the main body 20 as a mounting part. Therefore, the threaded-shaft 24 is made of conductive or semi-conductive resin, but the threaded-shaft may be individually formed. In this case, the threaded-shaft may be made of conductive metal.

A substance made of a distribution-mixing conductive metal filler in a base resin or a substance made by adding anti-charging polymer to a base resin may be used as the conductive resin material for the main ball 42 and the surface resistivity of $10^3$ to $10^{10}$ Ω/square is achieved by these materials. The base resin may be POM (polyacetal), PAI (polyamide-imide), PBI (polybenzimidazole), PCTFE (polychloro trifluoroethylene) PEEK (polyether ether ketone), PEI (polyetherimide), PI (polyimide), PPS (polyphenylene sulfide), melamine resin, aromatic polyamide resin (amide resin), or the like. Further, LCP (liquid crystal polymer), PBT (polybutylene terephthalate), PES (polyethersulfone), and other resins may be used. Vespel (aromatic polyimide resin, registered trademark by DuPont) or PBI is suitable for the characteristic stability against the environment in a vacuum device.

The main body 20 or the cover portion 30, and the retained ball-press ring 50 may be made of the same conductive resin materials.

Further, conductive resin has a broader meaning than insulating resin and includes a so-called semi-conductive resin and conductive resin.

In general, a composite resin having a volume resistivity of about $10^{13}$ Ωcm or less may be considered as a conductive resin in a broad sense in comparison to the insulating resin. Resin having a volume resistivity of about $10^5$ to $10^{13}$ Ωcm can be considered as semi-conductive resin, and a resin having a volume resistivity of about $10^5$ to $10^{10}$ Ωcm is a semi-conductive resin that is suitable for controlling electrostatic hazards, which is also known as antistatic resin. Therefore, a conductive resin (conductive resin-formed product) of the main ball in the free ball bearing of the present invention may be considered as a conductive or antistatic resin.

Further, the main body 20, cover portion 30, retainer balls 41 and main ball 42, and retained ball-press ring 50 of the free ball bearing of the present invention may be made of a material without conductivity or semi-conductivity (for example, metal or plastic).

As shown in FIGS. 1A and 1B, the threaded-shaft 24 of the main body 20 protrudes from the tip surface (bottom 23a) of the base end side of the ball retainer 23 having a block shape (in detail, a cylindrical shape).

In other words, the main body 20 has the ball retainer 23 having an external cylindrical shape larger than the threaded-shaft 24 protruding at one end of the threaded-shaft 24.

In the free ball bearing 10 of the example shown in the figure, the cover portion 30, in detail, has an integral configuration by thread-fastening a ring-shaped cap 33 with a main ball protrusion opening 31 on the outer circumferential surface of a ring-shaped base end-sided cover member 32 thread-fastened on the threaded-shaft 24 of the main body 20.

The base end-sided cover member 32 has a configuration in which a circumferential wall 32b protruding from the surface of one end of a bottom plate 32a is formed on the outer circumference of the ring-shaped bottom plate 32a. Further, the base end-sided cover member 32 is thread-fastened to the outer side of the threaded-shaft 24 by a female threaded-hole 32c formed through the center portion of the bottom plate 32a and the circumferential wall 32b is disposed to surround the ball retainer 23 of the main body 20. Further, in FIGS. 1A and 1B, the base end-sided cover member 32 and the bottom plate 32a are in contact with the bottom 23a of the ball retainer 23.

Further, the cap 33 has a configuration in which a side wall 33b protruding from one end surface of a ring-shaped cover plate portion 33a is formed on the outer circumference of the cover plate portion 33a where the main ball protrusion opening 31 is formed, an inner threaded-portion 33c formed on the inner circumferential surface of the side wall 33b is engaged with the outer threaded-portion 32d formed on the outer circumferential surface of the circumferential wall 32b of the base end-sided cover member 32 to be thread-fastened on the base end-sided cover member 32, and the end surface (tip surface 23b) around the opening of the ball-retaining recess 22 of the ball retainer 23 of the main body 20 is covered by the cover plate portion 33a.

Further, the cap 33 may have the following configuration by modifying the configuration described above. An annular-shaped inner groove 33c is formed on the inner circumferential surface of the side wall 33b. Further, an annular-shaped outer groove 32d is formed on the outer circumferential surface of the circumferential wall 32b of the base end-sided cover member 32. Further, the inner groove 33c and the outer groove 32d may be fitted (or inserted or snapped in).

As shown in FIGS. 1A and 1B, the retained ball-press ring 50 is a ring-shaped member which is fitted around the ball retainer 23 of the main body 20 to be movably received in the height direction of the ball retainer in an internal space 11 between the ball retainer 23 and the cover portion 30.

The retained ball-pressing ring 50 includes: a main body ring 53 that has a ring-shaped top plate portion 51 that is disposed between the cover plate portion 33a of the cap 33 and the tip surface 23b of the ball retainer 23 and a cylindrical portion 52 that is disposed between the outer circumferential surface 23c of the ball retainer 23 of the cap 33 protruding in a rib shape from one end surface of the top plate portion 51 throughout the outer circumferential surface of the top plate portion 51 and the inner circumferential surface 34 of the cover portion 30 opposite the outer circumferential surface 23c through the internal space 11; a driving ring portion 54 that is disposed between the outer circumferential surface 23c of the ball retainer 23 extending from the tip of the cylindrical portion 52 side of the main body ring 53 and the inner circumferential surface 34 of the cover portion 30 opposite the outer circumferential surface 23c through the internal space 11; and a ring-shaped pressing portion 55 that protrudes in a rib shape throughout the inner circumferential end of the top plate portion 51 of the main body ring 53 and is inserted between the semi-circular recessed surface 21 of the main body 20 and the main ball 42 to press the retained ball 41.

Figure 2:
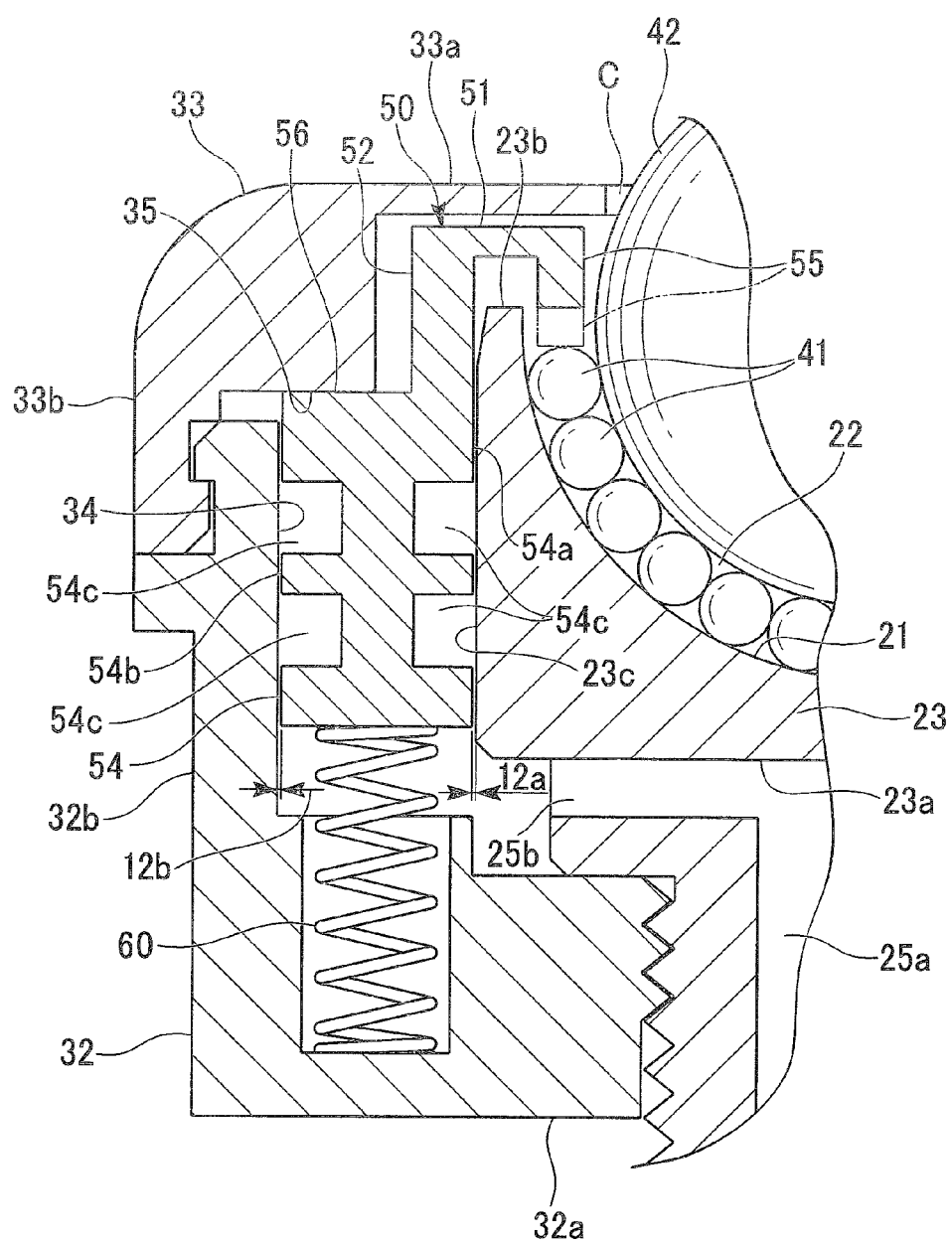
FIG. 2 is an enlarged cross-sectional view showing the portion around a ring for driving the retained ball-pressing ring of the free ball bearing of FIGS. 1A and 1B.

As shown in FIG. 2, the driving ring portion 54 has an inner circumferential surface 54a that is disposed close to the outer circumferential surface 23c of the ball retainer 23 through a small gap 12a allowing air to flow (hereafter, referred to as an inner circumferential small clearance or a first gap) and an outer circumferential surface 54b that is disposed close to the inner circumferential surface 34 of the cover portion 30, which is opposite the outer circumferential surface 23c of the ball retainer 23 through the internal space 11, through a small gap 12b allowing air to flow (hereafter, referred to as an outer circumferential small clearance or a second gap), and a groove 54c extending in the circumferential surface is formed (disposed) on the inner circumferential surface 54a and the outer circumferential surface 54b. The groove 54c is formed at a plurality of positions (two positions in the example shown in the figure) in the center axial line direction of the driving ring portion 54, on the inner circumferential surface 54a and the outer circumferential surface 54b.

The width of the inner circumferential small clearance 12a (the distance between the outer circumferential surface 23c of the ball retainer 23 and the inner circumferential surface 54a of the driving ring portion 54) is, for example, about 0.03 to 0.07 mm. The width of the outer circumferential small clearance 12b (the distance between the inner circumferential surface 34 of the cover portion 30 and the outer circumferential surface 54b of the driving ring portion 54) is set in the same size. The widths of the inner circumferential small clearance 12a and the outer circumferential small clearance 12b are set such that a displacement force is applied to the retained ball-pressing ring toward the base end side of the internal space when the air in the internal space 11 is sucked through an air hole 25, which is described below. The size may be adjusted to an appropriate size in accordance with the elastic force of the spring 60.

The air hole 25 (air suction hole) for sucking the air in the internal space 11 with a suction device 70 disposed outside the free ball bearing 10 is formed through the main body 20.

As shown in FIGS. 1A and 1B, the air hole 25, in detail, has a main hole 25a that is formed from the protruding tip end of the threaded-shaft 24 protruding from the bottom 23a of the ball retainer 23 to the ball retainer 23 and a diverging hole 25b that extends perpendicular to the main hole 25a from the rear end (the end of the ball retainer 23 side) of the main hole 25a and communicates with the internal space 11 through the outer circumferential surface 23c of the ball retainer 23. Therefore, it is possible to apply the suction force of the suction device 70 to the internal space 11 of the free ball bearing 10 by connecting the suction device 70 to a suction hole 25c that is the opening of the air hole 25 formed through the tip end of the threaded-shaft 24 (tip end protruding from the ball retainer 23).

In FIG. 4, the free ball bearing 10 is mounted on the base 81 by thread-fastening the threaded-shaft 24 in a threaded-hole 81a of the base 81 of the substrate locating table 80 from above the base 81. The threaded-shaft 24 is formed through the base 81 and the tip end protrudes under the base 81. Further, the free ball bearing 10 is mounted on the base 81 by bringing the bottom plate 32a of the base end-sided cover member 32 into contact with the top of the base 81.

In the substrate locating table 80 shown in FIG. 4, the free ball bearings 10 are mounted at a plurality of positions on the base 81 and the suction device 70 is connected to the tip ends protruding under the bases 81 of the threaded-shafts 24 of the free ball bearings 10 through pipes 71. The configuration that connects the suction device 70 to the air hole 25 of the free ball bearing 10 through the pipe 71 is a bearing unit according to the present invention.

Although it is described that the substrate locating table 80 is equipped with the bearing unit with (the internal spaces 11 of) all of a plurality of free ball bearings 10 mounted on the base 81 connected with one suction device 70 through the pipes 71, it is not limited thereto and the substrate locating table may be equipped with a plurality of suction devices 70 and a configuration in which the plurality of free ball bearings 10 mounted on the base 81 may be connected with different suction devices.

In the free ball bearing 10, it is possible to apply the suction force of the suction device 70 to the internal space 11 through the pipe 71 and the air hole 25.

When the suction force of the suction device 70 is not applied to the internal space 11, as shown in FIG. 1A, the retained ball-pressing ring 50 of the free ball bearing 10 is disposed at a position (also referred to as a standby position or an open position; position shown in FIG. 1A) spaced from the side (the open end side of the internal space 11) of the cover plate portion 33a of the cap 33 from the position where the pressing member 55 presses the retainer balls 41 of the ball retainer 23 (the position shown in FIG. 1B, hereafter, referred to as retained ball position or pressing position) by the elastic force of the spring 60.

In the free ball bearing 10 of the example shown in the figure, the position where a contact surface 56 (end surface of the main body ring side of the driving ring portion 54), which is formed at the stepped portion between the main body ring 53 of the retained ball-pressing ring 50 and the driving ring portion 54 positioned to be slightly deviated at the outer circumferential surface with respect to the main body ring 53, is in contact with the protrusion 35 expanding from the inner circumferential surface of the side wall 33b of the cap 33 from the base end side of the internal space 11 by the elasticity of the spring 60, is the standby position of the retained ball-pressing ring 50. When the retained ball-pressing ring 50 is at the standby position, the top plate portion 51 is not in contact with the cover portion 33a of the cap 33, where a small gap is ensured between the cover portion 33a of the cap 33 and the ring-shaped top plate portion 51.

With the retained ball-pressing ring 50 at the standby position shown in FIG. 1A without applying the suction force of the suction device 70 to the internal space 11 of the free ball bearing 10, when the suction force of the suction device 70 is applied to the internal space 11, as shown in FIG. 1B, the displacement force is applied to the retained ball-pressing ring 50 toward the base end side (the lower side in FIGS. 1A and 1B) of the internal space 11 and the retained ball-pressing ring 50 moves from the standby position to the base end side of the internal space 11 (in the pressing direction where the retainer balls 41 are pressed), such that the pressing member 55 of the retained ball-pressing ring 50 presses the retainer balls 41 in the ball retainer 23. As a result, rotation of the retainer balls 41 in the ball retainer 23 is restrained, such that rotational resistance against the main ball 42 increases, as compared with when the displacement force is applied to the base end side of the internal space 11.

As described above, in the driving ring portion 54, the inner circumferential surface 54a and the outer circumferential surface 54b are disposed close to the outer circumferential surface 23c of the ball retainer 23 and the inner circumferential surface 34 of the cover portion 30 through the small gaps 12a and 12b that allow air to flow. Further, as shown in FIG. 1A, when the retained ball-pressing ring 50 is at the standby position, the cylindrical portion 52 and the pressing member 55 of the main body ring 53 of the retained ball-pressing ring 50 are not in close contact with outer circumferential surface 23c of the ball retainer 23 or the outer circumferential surface 34 of the cover portion 30 while the small gap that allows air to flow is ensured between the ball retainer 23 and the cover portion 30 (a gap communicating with the gaps 12a and 12b at both sides of the driving ring portion 54).

When the suction force of the suction device 70 is applied to the internal space 11 of the free ball bearing 10 through the air hole 25, the air that exists around the main ball protrusion opening 31 rather than the driving ring portion 54 of the internal space 11 flows to the base end side rather than the driving ring portion 54 of the internal space 11 through the gaps 12a and 12b. Further, some of the air flowing through the gaps 12a and 12b makes turbulence flowing into the groove 54c formed on the driving ring portion 54 and generates a pressing force that presses the inner surface 54d positioned particularly at the tip end side of the driving ring portion 54 of the groove 54c (the base end side of the internal space 11, the read end side opposite the front end side where the top plate portion 51 of the retained ball-pressing ring 50 is disposed). Therefore, a displacement force is applied to the retained ball-pressing member 50 toward the base end side of the internal space 11 and a displacement force larger than the elasticity of the spring 60 is applied to the retained ball-pressing member 50 by the suction force of the suction device 70, such that, as shown in FIG. 1B, the retained ball-pressing ring 50 moves to the base end side (in the pressing direction) of the internal space 11.

Although further research is necessary, it can be considered that as the number of the grooves 54c increases, the displacement force applied to the retained ball-pressing ring 50 may be increased by the suction force of the suction device 70.

Further, the retained ball-pressing ring 50 is maintained stable in a non-contact state with the outer circumferential surface 23c of the ball retainer 23 and the inner circumferential surface 34 of the cover portion 30 by the air flowing through the gaps 12a and 12b at the outer circumferential surface side and the inner circumferential surface side of the driving ring portion 54. Therefore, since it is possible to prevent movement resistance from being generated by contact with the cover portion 30 and the ball retainer 23 of the retained ball-pressing ring 50, the movement resistance of the retained ball-pressing ring 50 due to the contact with the ball retainer 23 and the cover portion 30 hardly has any effect.

Lubricant grease for reducing the movement resistance of the retained ball-pressing ring 50 is not provided in the gaps 12a and 12b of the outer circumferential side and the inner circumferential side of the driving ring portion 54.

In the free ball bearing 10, since the non-contact state of the outer circumferential surface 34 of the cover portion 30 and the outer circumferential surface 23c of the ball retainer 23 is stably maintained by the air flowing through the gaps 12a and 12b of the outer circumferential surface side and the inner circumferential surface side of the driving ring portion 54, as described above, even though grease is not provided between the retained ball-pressing ring 50 and the ball retainer 23 and between the retained ball-pressing ring 50 and the cover portion 30, it is possible to restrain the movement resistance of the retained ball-pressing ring to a low level. Further, it is possible to make the movement of the retained ball-pressing member 50 smooth.

Therefore, it is not necessary to greatly increase the suction force of the suction device 70 which is required for the movement of the retained ball-pressing ring 50 (movement from the standby position to the retained ball-pressing position) with the configuration that does not use grease, and it is possible to implement the movement of the retained ball-pressing ring 50 without greatly increasing the suction force.

Further, since the configuration does not use grease, the problem of contamination of the inside of the clean room due to the volatile components scattered from the grease does not arise.

Further, as shown in FIG. 1A, the gap between the ball retainer 23 of the main body 20 and the retained ball-pressing ring 50 at the standby position is also ensured in between the pressing member 55 of the retained ball-pressing ring 50 and the ball retainer 23, such that when the air in the internal space 11 starts to be sucked by the suction device 70, the air inside the ball-retaining recess 22 of the ball retainer 23 is also sucked into the suction device 70 through the gap between the ball retainer 23 of the main body 20 and the retained ball-pressing ring 50.

The outer diameter of the pressing member 55 of the retained ball-pressing ring 50 is slightly smaller than the inner diameter of the opening of the ball-retaining recess 22, and when the pressing member 55 is at the retained ball-pressing position, the outer circumferential surface of the pressing member 55 is not in contact with the semi-circular recessed surface 21 of the ball-retaining recess 22, and the gap allowing air to flow is ensured between the pressing member 55 and the semi-circular recessed surface 21. Therefore, the suction of the air into the ball-retaining recess 22 by the suction device 70 is maintained even though the pressing member 55 is at the retained ball-pressing position. Therefore, even if the pressing member 55 comes in contact with the retainer balls 41 and a small amount of dust is generated, the dust can be collected into the suction device 70 by the air sucked into the ball-retaining recess 22 by the suction device 70, such that it is possible to prevent the dust from being discharged outside from the main ball protrusion opening 31 of the cover member 30.

Further, the pressing member 55 is not in contact with the main ball 42, when the pressing member 55 is at the retained ball-pressing position.

As shown in FIGS. 4 and 5, in the substrate locating table 80, the substrate 1 is carried on the base 81, with the retained ball-pressing ring 50 of the free ball bearing 10 at the standby position. Further, the substrate 1 is located by the pair of L-shaped locating members 87 of the locating device (the substrate 1 is interposed between a pair of locating members 87), and then the retainer balls 41 are pressed by the retained ball-pressing ring 50 by applying the suction force of the suction device 70 into the internal space 11 of the free ball bearing 10 such that the retainer balls 41 and the main ball 42 are restrained from rotating, and the substrate 1 is released from the pair of locating members 87 of the locating device.

The substrate 1 (particularly, a large-sized substrate) may be slightly warped (shaken) when being placed on the base 81, such that the warping (shaking) may not be prevented even if the substrate is located while being interposed between the plurality of locating members 87 in many cases. Further, when the substrate 1 is released by opening the locating members, with the warping (shaking) remaining, a slight positional deviation may be generated by the shaking. When the positional deviation of the substrate 1 on the substrate locating table 80 is large and is still not removed even after the substrate is carried in the processing room 83 by the substrate carrying device (carrying device in the processing room) in the processing room 83 (see FIG. 3), it also influences the process performed in the processing room, such that reduction or removal of the positional deviation of the substrate 1 on the substrate locating table 80 is preferable in view of ensuring the process accuracy, such as processing of the substrate 1.

In the related art, a free ball bearing in which the rotational resistance against the main ball is as small as possible is required for the substrate locating table. However, when the rotational resistance against the main ball is extremely small, it was found that the positional deviation due to warping (shaking) of the substrate increases, when the substrate 1 is released by opening the substrate locating members with the substrate 1 interposed therebetween.

The inventors found that it is possible to reduce or remove the positional deviation of the substrate 1 after releasing the substrate 1 interposed between locating members by releasing the substrate interposed by the pair of locating members 87 of the locating device, with the retainer balls 41 and the main ball 42 in which the rotations are suppressed by pressing the retainer balls 41 with the retained ball-pressing ring 50.

Further, it was found that it is preferable to restrain displacement of the substrate 1 with the rotational resistance against the main ball 42 by allowing rotation of the main ball 42 corresponding to micromotion of the substrate 1, rather than fixing the main ball 42 so as not to rotate after releasing the substrate 1 interposed between the locating members, in view of restraining the positional deviation of the substrate after releasing the substrate 1 interposed between the locating members, when restraining the rotation of the retainer balls 41 and the main ball 42 by pressing the retainer balls 41 with the retained ball-pressing ring 50.

Therefore, it is not necessary to fix the retainer balls 41 such that the retainer balls 41 cannot rotate, but it needs only to restrain the rotation of the retainer balls 41 and correspondingly restrain the rotation of the main ball 42, when pressing the retainer balls 41 with the retained ball-pressing ring 50.

Therefore, the pressure (that is, the suction force of the suction device 70) applied to the retained ball-pressing ring 50 required for pressing the retainer balls 41 is not necessarily a strong force that can fix the main ball 42 so as not to rotate.

Figure 6:
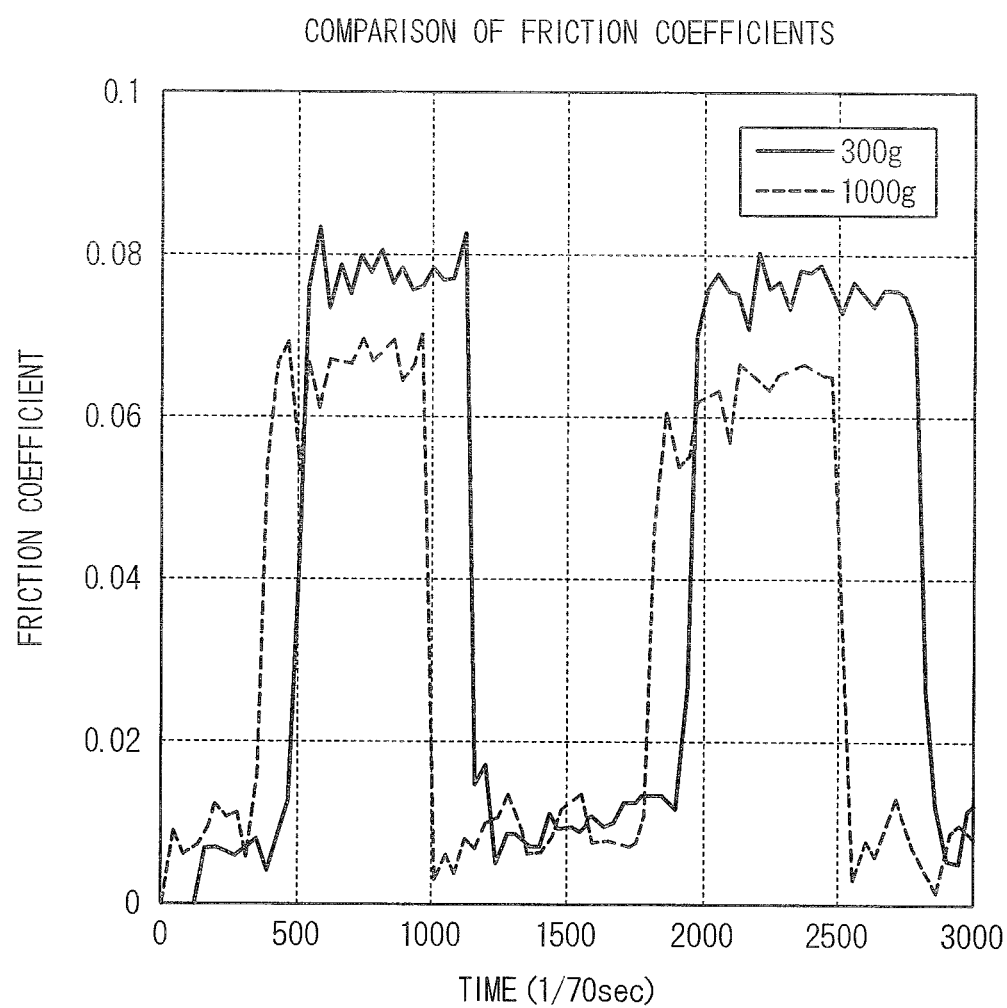
FIG. 6 is a graph showing a test result that examined friction resistance in the free ball bearing of FIGS. 1A and 1B.

The inventors manufactured a test support table with three free ball bearings 10 on the plate material and placed an aluminum plate on the three free ball bearings 10 of the support table, and then examined the friction coefficient of the free ball bearings 10 when the restraint of rotation of the retainer balls 41 and the main ball 42 by the retained ball-pressing ring 50 was not performed without applying a suction force of a suction device (released state), and when the rotation of the retainer balls 41 and the main ball 42 is restrained by the retained ball-pressing ring 50 by applying a suction force (restrained state). The result is shown in FIG. 6.

For the aluminum plates, two kinds of aluminum plates of which the weights (work weight) were 300 g and 500 g were used. Further, the suction force (degree of vacuum to the atmospheric pressure) applied to one free ball bearing 10 by the suction device was −90 kPa and the suction rate (the amount of intake air) per free ball bearing 10 was 9.0 L/min.

The small clearances 12a and 12b of inner circumferential side and the outer circumferential side of the retained ball-pressing ring 50 were both 0.05 mm.

Further, a configuration having a main body, a cover portion, a main ball, a retained ball-pressing member made of POM, and retainer balls made of stainless steel was used for the free ball bearing 10.

As shown in FIG. 6, the free ball bearing 10 enters the restraint state in a short time when the suction force of the suction device is applied, and the restraint state is switched into the release state in a short time, such that it is possible to achieve a high response speed.

Further, when the work weight is 300 g, the friction coefficient in the releasing (release state) is 0.01, while the friction coefficient in the restraining (restraint state) is 0.06, such that an approximate six-time friction coefficient is acquired in the releasing.

When the aluminum plates each having the 500 g are used, the friction coefficient in releasing (release state) is 0.01, while the friction coefficient in the restraining (restraint state) is 0.08, such that an approximate eight-time friction coefficient is acquired in the releasing.

Figure 7:
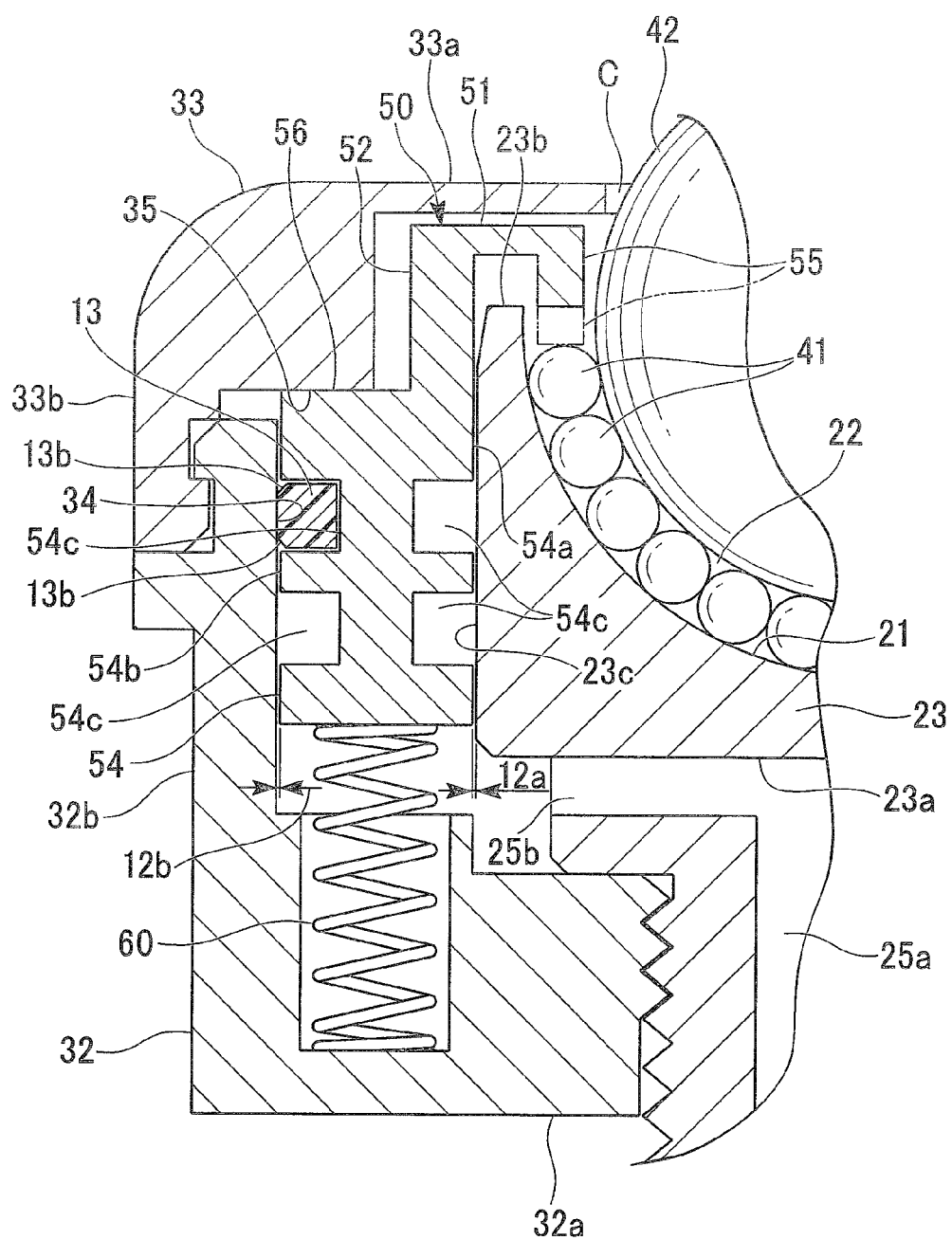
FIG. 7 is a view showing the configuration of the free ball bearing according to the first embodiment of the present invention, which is an enlarged cross-sectional view showing the portion around the ring for driving the retained ball-pressing ring.
Figure 8:
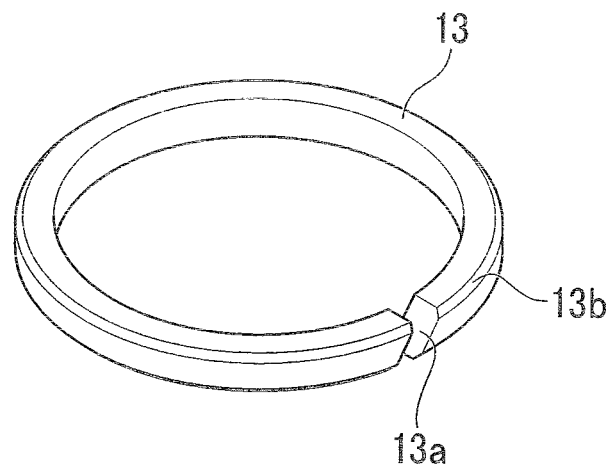
FIG. 8 is a perspective view showing an example of a wear ring.

Since the free ball bearing 10 acquires a friction coefficient remarkably higher in restraining than in releasing, it is correspondingly possible to use a method of fixing the main ball so as not to rotate in restraining Second Embodiment Next the second embodiment of the present invention is described. As shown in FIGS. 7 and 8, a free ball bearing described in the embodiment is implemented by mounting a wear ring 13 at the side of the outer circumferential surface 54b of the driving ring portion 54 of the retained ball-pressing ring 50 of the free ball bearing 10 of the first embodiment described above.

The wear ring 13 protrudes from the outer circumferential surface 54b of the driving ring portion 54, in contact with the inner circumferential surface 34 of the cover portion 30. Further, in the free ball bearing of the embodiment, as the wear ring 13 slides on the inner circumferential surface 34 of the cover portion 30, the retained ball-pressing ring 50 moves in the height direction of the ball retainer.

When the suction force of the suction device 70 is applied to the internal space 11 of the free ball bearing, the suction force applied to the outer circumferential surface-sided small clearance 12b is converted into a displacement force (displacement force toward the base end side) of the retained ball-pressing ring 50 by the wear ring 13.

As shown in FIG. 8, the wear ring 13 is a discontinuous ring-shaped member with a slit 13a (cut-off portion).

When the suction force of the suction device 70 is applied to the internal space 11 of the free ball bearing, air flow is formed in the outer circumferential surface-sided small clearance 12b through the slit 13a.

Further, the forming of the air flow in the inner circumferential surface-sided small clearance 12a is the same as in the first embodiment.

Further, for the wear ring 13, it is preferable that friction resistance on the outer circumferential surface be small, and a wearing ring made of plastic, such as polyamide, may be suitably used. The wear ring 13 is preferably made of a material that can restrain the friction resistance on the outer circumferential surface to a low level, and it is not specifically limited.

Further, the wear ring 13 has chamfered portions 13b at both edges in the center axial line of the retained ball-pressing ring 50, such that the chamfered portions 13b efficiently contribute to reducing the friction resistance (slide resistance).

Therefore, the free ball bearing of the embodiment does not use grease (non-grease) and can smoothly operate the retained ball-pressing ring.

In the present invention, the wear ring 13 may be fitted on the inner circumferential side of the retained ball-pressing ring 50 (in detail, the driving ring portion 54) or may be on both of the inner circumferential side and the inner circumferential surface.

Further, the wear ring 13 may be disposed at a plurality of positions in the center axial line direction of the driving ring portion 54, on the inner circumferential side and/or the outer circumferential side of the driving ring portion 54.

Further, in the retained ball-pressing ring according to the present invention, the groove 54c may be formed at one or a plurality of positions in the center axial line direction of the driving ring portion 54 on only one of the inner circumferential side and the outer circumferential side of the driving ring portion 54 or may be formed on both of the inner circumferential side and the outer circumferential side of the driving ring portion 54, and the wear ring 13 may be disposed on the inner circumferential side and/or the outer circumferential side of the driving ring portion.

Third Embodiment

Next, the third embodiment of the present invention is described with reference to FIG. 9.

Figure 9:
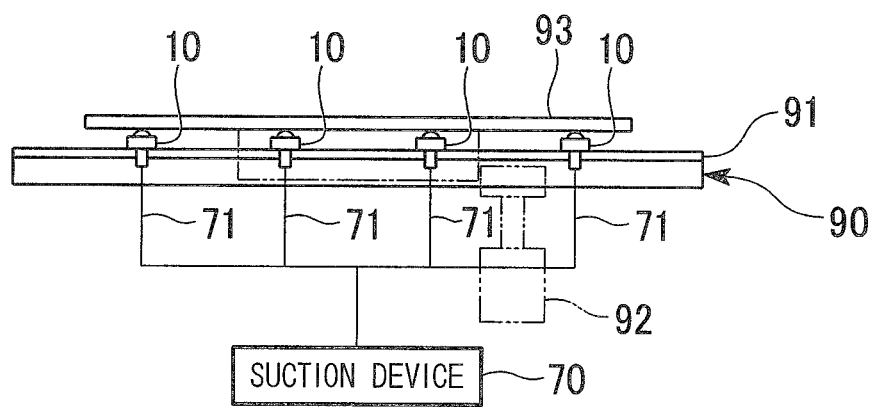
FIG. 9 is a side view showing an example of a turntable.

FIG. 9 shows free ball bearings 10 according to the present invention and a turntable 90 equipped with a bearing unit implemented by connecting a suction device 70 to air holes 25 of a plurality of free hole bearings 10 through pipes 71.

The turntable 90 includes a plate-shaped base member 91, a rotary table 93 that is mounted on the base member 91 and rotatably supported by a plurality of (three or more) free ball bearings 10 protruding from the top of the base member 91, and a rotation driving device 92 (motor) that rotates the rotary table 93. As described above, since each of the free ball bearings 10 is connected to the suction device 70 through the pipe 71, it is possible to restrain and stop the rotation of the rotary table 93 by applying the suction force of the suction device 70 to the internal space 11.

Further, a configuration in which the free ball bearing 10 is mounted on the rotary table or a configuration in which the free ball bearing 10 is mounted on the rotary table and the base member may be used for the turntable.

The support table according to the present invention may use the same configuration as the substrate locating table 80 described above as a portion of the carrying device that carries a substrate or other items.

The free ball bearing and the support table according to the present invention can be widely used for carrying items in the clean room (for example, used as a part of a carrying device) and locating, including making food or medicines, other than machining, for example, a semiconductor substrate or a printed circuit board, mounting electronic components, manufacturing a flat panel, and manufacturing electronic components, such as a semiconductor device or a semiconductor package.

Further, a free ball bearing according to the present invention may have the following configuration: a main body that has a ball retainer where a ball-retaining recess having an inner surface of a semi-circular recessed surface is formed; a plurality of retainer balls that is disposed on the semi-circular recessed surface of the main body and a main ball that has a diameter larger than the retainer balls and is rotatably supported through the ball retainer; a housing-shaped cover portion that is formed to surround the ball retainer of the main body; a retained ball-pressing ring that has a ring-shaped pressing member that is inserted in between the semi-circular recessed surface and the main ball of the main body and increases rotational friction against the main ball by pressing the retained ball, and is disposed to be movable in the height direction of the ball retainer in the same direction as the depth direction of the ball-retaining recess in an internal space ensured between the ball retainer and the cover portion; and a releasing mechanism that applies a displacement force to the retained ball-pressing ring in the opposite direction to the pressing direction in which the retainer balls are pressed by the pressing member in the height direction of the ball retainer, and disposes the retained ball-pressing ring to a standby position spaced apart from a retained ring-pressing position where the retainer balls are pressed, using the pressing member, in which a portion of the main ball protrudes from a main ball protrusion opening formed through the cover portion and the main ball is prevented from falling out by the cover portion, an air hole for sucking air in the internal space is formed through a base end side opposite the main ball protrusion opening of the cover portion, in the height direction of the ball retainer of the internal space, at the main body and/or the cover portion, the retained ball-pressing ring includes a driving ring portion disposed between the outer circumference surface of the ball retainer and the inner circumferential surface of the cover portion which is opposite the outer circumferential surface of the ball retainer through the internal space, the driving ring portion has an inner circumferential surface disposed close to the outer circumferential surface of the ball retainer through a small gap allowing air to flow and an outer circumferential surface disposed close to the inner circumferential surface of the cover portion through a small gap allowing air to flow, a groove circumferentially extending or a wear ring is disposed on the inner circumferential surface and/or the outer circumferential surface, a displacement force is applied to the retained ball-pressing ring toward the base end side of the internal space by sucking the air in the internal space through the air hole, such that the retained ball-pressing ring is moved from the standby position to the retained ball-pressing position, and the retained ball-pressing ring is disposed at the standby position by the releasing mechanism when the air in the internal space is not sucked.

INDUSTRIAL APPLICABILITY

According to the present invention, as the air in the internal space is sucked through the air hole formed at the main body and/or the cover portion of the free ball bearing, it is possible to apply a displacement force to the retained ball-pressing ring toward the base end side of the internal space of the free ball bearing, such that rotational resistance against the main ball can be increased by pressing the retainer balls with the ring-shaped pressing member protruding from the retained ball-pressing ring.

REFERENCE SIGNS LIST

1: SUBSTRATE
10: FREE BALL BEARING
11: INTERNAL SPACE
20: MAIN BODY
23: BALL RETAINER
30: COVER PORTION
41: RETAINED BALL
42: MAIN BALL
50: RETAINED BALL-PRESSING RING

The invention claimed is:
1. A free ball bearing comprising:
a main body that has a ball retainer where a ball-retaining recess having an inner surface of a semi-circular recessed surface is formed;
a plurality of retainer balls that is disposed on the semi-circular recessed surface of the main body and a main ball that has a diameter larger than the retainer balls and is rotatably supported through the retainer balls;
a cover portion that surrounds the ball retainer of the main body while ensuring a predetermined internal space;
a retained ball-pressing ring that has a ring-shaped pressing member that is inserted in between the semi-circular recessed surface of the main body and the main ball and presses the retainer balls, and is disposed to be movable in the internal space in the depth direction of the ball-retaining recess, between a pressing position where the retainer balls are pressed and a releasing position where the retainer balls are released; and
a releasing mechanism that moves the retained ball-pressing ring from the pressing position to the releasing position by applying a displacement force to the retained ball-pressing ring,
wherein a main ball protrusion opening having a diameter smaller than the diameter of the main ball is formed through the cover portion,
a portion of the main ball protrudes from the main ball protrusion opening toward a tip end side,
an air suction hole that communicates with the internal space and is open to a base end side opposite the tip end side is formed through at least one of the main body and the cover portion,
the retained ball-pressing ring includes a driving ring portion disposed between an outer circumferential surface of the ball retainer and an inner circumferential surface of the cover portion,
the driving ring portion has an inner circumferential surface disposed close to the outer circumferential surface of the ball retainer through a first gap allowing air to flow and an outer circumferential surface disposed close to the inner circumferential surface of the cover portion through a second gap allowing air to flow,
a groove circumferentially extending or a wear ring is disposed on at least one of the inner circumferential surface and the outer circumferential surface of the driving ring portion, and
the first gap and the second gap are sized such that a displacement force is applied to the retained ball-pressing ring toward the base end side of the internal space when the air in the internal space is sucked through the air suction hole.
2. The free ball bearing according to claim 1, further comprising a spring that applies a displacement force to the retained ball-pressing ring and elastically biases the retained ball-pressing ring toward the releasing position from the pressing position, in the internal space as the releasing mechanism.
3. The free ball bearing according to claim 1 or 2,
wherein the main body further has a threaded-shaft protruding from the base end side of the ball retainer, and
the air suction hole is formed at the main body and is open to the outer circumferential surface of the ball retainer through the threaded-shaft in the center axial direction of the threaded-shaft.
4. The free ball bearing according to claim 1 or 2,
wherein the cover portion includes:
a ring-shaped base end-sided cover member that is thread-fastened to a threaded-shaft of the main body; and
a ring-shaped cap that is fitted or thread-fastened on an outer circumferential portion of the base end-sided cover member and has the main ball protrusion opening.
5. A bearing unit comprising:
the free ball bearing according to claim 1 or 2; and
a suction device connected to the air suction hole of the free ball bearing.
6. A support table comprising:
a plurality of free fall bearings according to claim 1 or 2; and,
a suction device connected to the air suction holes of the free ball bearings,
wherein the free ball bearings are mounted at a plurality of positions on a horizontal base, and
pipes connecting the suction device to the air suction holes of the free ball bearings to suck air are connected to the air suction holes from under the base.
7. A carrying equipment equipped with the support table according to claim 6.
8. A turntable comprising:
a plurality of the free fall bearings according to claim 1 or 2;
a base member;
a rotary table rotatably disposed on the base member; and
a rotating device rotating the rotary table, wherein the rotary table is rotatably supported with respect to the base member by the free ball bearings which are mounted on at least one of the base member and the rotary table, and a suction device is connected to each free ball bearing.

* * * * *